UNITED STATES PATENT OFFICE.

CARL AUER VON WELSBACH, OF VIENNA, AUSTRIA-HUNGARY, ASSIGNOR TO THE WELSBACH INCANDESCENT GAS LIGHT COMPANY, OF NEW JERSEY.

METHOD OF STRENGTHENING MANTLES FOR TRANSPORTATION.

SPECIFICATION forming part of Letters Patent No. 463,470, dated November 17, 1891.

Application filed May 23, 1889. Serial No. 311,889. (No specimens.) Patented in England April 28, 1889, No. 6,239.

*To all whom it may concern:*

Be it known that I, CARL AUER VON WELSBACH, a subject of the Emperor of Austria, residing at Vienna, Austria-Hungary, have invented new and useful Improvements in Methods of Strengthening Mantles for Transportation, (for which I have obtained a patent in Great Britain, No. 6,239, dated April 28, 1889,) of which the following is a specification.

The object of my invention is to provide a simple and reliable means of strengthening the fragile skeleton-like "mantles" of refractory earthy materials used in what is known as the "Welsbach incandescent-gas-lighting system," so that said mantles can be safely transported from the manufacturer to the consumer without breakage. These mantles are usually made by saturating a textile fabric with a solution of a salt or salts of refractory earths—such as thorium, zirconium yttrium, lanthanum, &c.—capable of giving light by incandescence when subjected to the action of a gas-flame, the mantle after drying and shaping being incinerated to burn away the textile material and leave only a skeleton composed of the refractory earthy oxides that result from the decomposition of the salts. As the calcined or burned mantles in condition for use are very tender and somewhat readily destroyed, they cannot withstand strong concussion during transportation. If, however, the mantle is coated with a pliable substance that can be readily burned away and which prevents the particles of the mantle from being shifted relatively to each other, the mantle will be rendered more elastic and can be transported without injury. The substance employed as a protective and strengthening coating should be of a character that will not impair the light-giving qualities of the mantle.

To this end my invention consists in a method of strengthening mantles for transportation, which consists in coating or saturating the finished or burned mantles with a solution of a salt or salts of the rarer earthy metals or refractory earths similar to the saturating fluid used in the manufacture of the mantles, but preferably containing an excess of lanthanum, after which the mantles may be exposed in a closed vessel or apartment to the fumes of ammonia or to the vapors of oxalic acid, benzoic acid, or like substances that will penetrate the pores of the mantle and dry to a gum-like very coherent but elastic mass that will enable the mantle to withstand strong shocks or vibrations. Mantles prepared in this manner can be safely packed and transported, and when arrived at their destination can be placed in position over a gas-burner and the protective coating be burned out, thereby reducing the earthy salt or salts to the form of oxide, which serve to increase the incandescence of the mantle.

The strengthening-fluid may be an aqueous solution of any of the well-known salts of the refractory earths, such as are used in the manufacture of mantles. Of these lanthanum, zirconium, yttrium, and thorium are preferred; and the selected salt is preferably employed in the form of nitrate. The salt of lanthanum may be used alone in aqueous solution or mixed with salts of any or all of the other refractory earths above named, or with others having similar properties. No precise proportions are necessary, though it is preferable that the salt of lanthanum be in excess of the others. Lanthanum, while rich in light-giving quality, is not sufficiently durable to be used alone in the manufacture of mantles; but after the mantles have been made from other earthy materials—such as thorium, yttrium, or zirconium—and subjected to the incinerating operation in a well-known manner they can be effectively strengthened by means of a fluid or solution rich in lanthanum. After the finished and burned mantle has been saturated with a strengthening solution of a salt of lanthanum or other refractory earth capable of producing an incandescing oxide by the decomposing effect of heat, the mantle should be dried by exposure to the air, and can then be safely packed for transportation.

As an additional protection, mantles impregnated, as above described, with a strengthening solution containing a nitrate may be exposed in a closed vessel or apartment to an atmosphere of ammonia, whereby a hydrate is formed in the pores of the mantle which dries in the air to a gum-like, elastic, and very coherent mass, so that a mantle treated in this way will successfully withstand very strong shocks or vibrations. Instead of employing an atmosphere of ammonia for producing the above-described gum-like condition of the mantle-coating an atmosphere consisting of the vapors of oxalic acid or benzoic acid, or other resinous acid, or an aqueous solution of these, may be used.

By my method of treating mantles for transportation it is possible to confine the movement of the particles of the mantle within the range of their elasticity, so that these fragile articles are prepared to encounter the dangers of transportation without injury. It is thus further made possible to give a mantle a greater percentage of lanthanum oxide than was practicable during the process of manufacture because of its lack of durability, while after a comparatively firm structure has been obtained in the completed mantle lanthanum can be used with great benefit in the strengthening solution, with the result, also, of giving to the mantle after its second burning a higher power of emitting light than it originally possessed.

This method of strengthening mantles for transportation, beside improving their light-giving qualities, also possesses the advantage of protecting the mantles from the deteriorating influences of a dust-laden atmosphere.

In a former application I have described and claimed a method of regenerating deteriorated mantles by applying to them an additional coating of a solution of a salt or salts of the rarer metals or refractory earths, so that when such mantles are exposed to heat the salt will become decomposed, its acid driven off, and the mantle be revivified or regenerated by the earthy oxides that result from the decomposition of the regenerating fluid; but this I do not herein claim.

Mantles have heretofore been prepared for transportation by dipping them in melted tallow, beeswax, or paraffine-wax, or in a mixture of paraffine and volatile hydrocarbon or in paraffine alone. They have also been immersed in a solution of resinous, glutinous, or farinaceous substances. These I do not claim. When treated with these substances the mantles are liable to have their porous structure clogged by deposits of carbon left after burning away the protective and strengthening coating. This does not occur when the mantle is treated with a protective and strengthening solution of a salt or salts of refractory earths similar to those employed in its original manufacture, which solution not only strengthens the mantle, but protects it from deteriorating influences and adds materially to its light-giving qualities.

What I claim as my invention is—

1. The method of strengthening mantles for transportation, which consists in saturating them with a solution of a salt or salts of the rarer metals or refractory earths containing an excess of a salt of lanthanum, substantially as described.

2. The method of strengthening mantles for transportation, which consists in coating them with a solution of a salt or salts of the rarer metals or refractory earths and exposing them to an atmosphere of ammonia or of the vapors of oxalic acid or benzoic acid, substantially as described.

In testimony whereof I have affixed my signature in presence of two witnesses.

CARL AUER VON WELSBACH.

Witnesses:
   FRED WILLIAMS,
   FELISE KRISCHEWILZ.